(12) United States Patent
Devall

(10) Patent No.: US 6,302,137 B1
(45) Date of Patent: Oct. 16, 2001

(54) FUEL TANK VALVE WITH INTERNAL FUEL TANK VENT TUBE

(75) Inventor: Jeffrey E. Devall, Alberquenny (GB)

(73) Assignee: Stant Manufacturing Inc., Connersville, IN (US)

(*) Notice: Subject to any disclaimer, the term of this patent is extended or adjusted under 35 U.S.C. 154(b) by 0 days.

(21) Appl. No.: 09/667,316

(22) Filed: Sep. 22, 2000

Related U.S. Application Data

(60) Provisional application No. 60/155,521, filed on Sep. 22, 1999.

(51) Int. Cl.[7] .................................................. F16K 24/04
(52) U.S. Cl. ............................................. 137/202; 137/587
(58) Field of Search ..................................... 137/202, 578, 137/579, 87, 590

(56) References Cited

U.S. PATENT DOCUMENTS

| | | |
|---|---|---|
| 4,816,045 | 3/1989 | Szlaga et al. . |
| 5,156,178 | 10/1992 | Harris . |
| 5,687,778 | 11/1997 | Harris . |
| 5,694,968 | 12/1997 | Devall et al. . |
| 6,089,249 | 7/2000 | Thibaut et al. . |

*Primary Examiner*—Gerald A. Michalsky
(74) *Attorney, Agent, or Firm*—Barnes & Thornburg

(57) ABSTRACT

A fuel venting system for fuel tank chambers. The system vents through an opening in one of the chambers, with fuel vapor being transferred from the other chambers to the venting chamber. Fuel vapor transfer between chambers is facilitated by a conduit having a buoyant float attached at one end and flexibly connected at the other end to an anchor device fixed in the vent hole.

26 Claims, 5 Drawing Sheets

FUEL TANK VALVE WITH INTERNAL FUEL TANK VENT TUBE

This application claims priority under 35 U.S.C. 119(e) to U.S. Provisional Application Ser. No. 60/155,521, filed Sep. 22, 1999, which is expressly incorporated by reference herein.

BACKGROUND AND SUMMARY OF THE INVENTION

The present invention relates to a tank venting system, and particularly to a system for venting multiple fuel vapor chambers coupled to a fuel tank. More particularly, the present invention relates to a system for venting two chambers coupled to a fuel tank which are not in fuel vapor-transferring communication with one another when the fuel tank is full or nearly full.

It is well understood that significant quantities of fuel vapor can escape from a fuel tank through the filler neck to the atmosphere during the refueling of motor vehicles. Early attempts to control the vapor escape focused upon control devices fitted to a fuel-dispensing pump nozzle connected to a service station fuel pump. Later, control devices mounted directly on-board the vehicle were developed. See, for example, U.S. Pat. No. 4,816,045 to Szlaga et al., relating to a vapor-recovery system mounted on the fuel tank filler neck. Tank venting systems which mount to a fuel tank have also been developed as shown, for example, in U.S. Pat. No. 5,156,178 to Harris. The foregoing '045 and '178 patents are hereby incorporated by reference herein.

In addition to controlling vapor escape, well-designed tank venting systems also assist in controlling the amount of liquid fuel which can be pumped into the fuel tank during refueling for safety reasons, fuel systems are designed so that the fuel tank is never completely filled with liquid fuel. Rather, at least a predetermined portion of the space inside the fuel tank is left for liquid fuel and fuel vapor expansion. Although fuel pump nozzles typically include sensors for shutting off the flow of liquid fuel into the fuel tank when the fuel tank is nearly filled, fuel pump users may manually override the sensors by continuing to pump fuel after the sensors have automatically and temporarily shut the pump nozzle off. To assist in preventing tank overfill under such conditions, a tank venting system is usually provided with a "fill-limit" control system which assists in triggering the nozzle shut-off mechanism when the level of liquid fuel in the fuel tank has risen to a predetermined level. See, for example, the fill-limit control system disclosed in U.S. Pat. No. 4,816,045 to Szlaga et al., which disclosure is hereby incorporated by reference herein.

It has also long been recognized that fuel vapor is generated in the fuel tank during operation of the vehicle, for example, by evaporation or by sloshing of the liquid fuel against the walls of the tank. Excessive pressure can build up in the fuel tank as a result of the newly formed fuel vapor unless control devices are provided to vent the fuel vapor from the fuel tank during vehicle operation. Such valves have been referred to as "run-loss" valves or tank venting rollover valves because they handle fuel vapor loss during vehicle run and are capable of preventing liquid fuel carry-over during vehicle rollover.

Fuel tanks are being made now out of plastics materials and being shaped to nest in various irregular nooks and crannies formed on the underside of vehicles. Such fuel tanks may be formed to include, for example, two vapor chambers positioned to fit into such nooks and crannies and lie above what would otherwise be the top wall of the fuel tank. Heretofore, it has been necessary to make two hole cuts in the fuel tank having two vapor chambers, one hole cut for each of the vapor chambers, so that a vent valve can be provided for each of the two vapor chambers.

According to the present invention, a tank venting system includes a tank, first and second vapor domes mounted on top of the tank to lie in spaced-apart relation to one another so that each dome receives fuel vapor generated by liquid fuel extant in the tank, yet the domes are isolated from one another when the tank is full of fuel, and a vent apparatus coupled to the first vapor dome and adapted to vent pressurized fuel vapor in the first vapor dome to an external destination. The tank venting system further includes dome vent means located inside the fuel tank for transferring pressurized fuel vapor extant in the second vapor dome into the first vapor dome so that such transferred fuel vapor can be vented to an external destination by the vent apparatus coupled to the first vapor dome.

In preferred embodiments, the dome vent means includes a fuel vapor transfer conduit formed to include a conduit inlet, a conduit outlet, and a vent passageway extending between the conduit inlet and outlet. The dome vent means also includes conduit support means for supporting the transfer conduit in an interior region of the tank so that it is able to pivot about an axis to move the conduit inlet from a lowered position to a raised position within the tank as the fuel level rises in the tank during refueling while the conduit outlet remains in the first vapor dome.

The conduit support means includes a buoyant float coupled to the transfer conduit at the conduit inlet to cause the conduit inlet always to remain above the top surface of liquid fuel extant in the tank and to communicate with and receive pressurized fuel vapor extant in the second vapor dome when the tank is full. The conduit support means also includes an anchor mounted in an aperture formed in a top wall of the first vapor dome. The anchor includes a sleeve extending through the aperture and surrounding the vent apparatus and a support frame having one end rigidly coupled to the sleeve and another end pivotably coupled to the transfer conduit at the conduit outlet.

When the tank is full or nearly full, pressurized fuel vapor trapped in the isolated second vapor dome passes into the vent passageway formed in the fuel vapor transfer conduit through the conduit inlet that is raised above the top surface of liquid fuel in the tank by the buoyant float. Except for the conduit inlet and outlet, most of the fuel vapor transfer conduit is submerged in liquid fuel extant in the tank when the tank is full or nearly full. Pressurized fuel vapor admitted into the vent passageway through the conduit inlet is then conducted by the transfer conduit into the first vapor dome for discharge from the tank to an external destination (such as a vapor-recovery canister) by the vent apparatus coupled to the first vapor dome. Thus, no vent apparatus need be mounted on the second vapor dome to vent pressurized fuel vapor from the second vapor dome and only one hole cut need be made in the first vapor dome to receive the single first vapor dome vent apparatus (and the sleeve of the anchor that surrounds that vent apparatus) therein.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
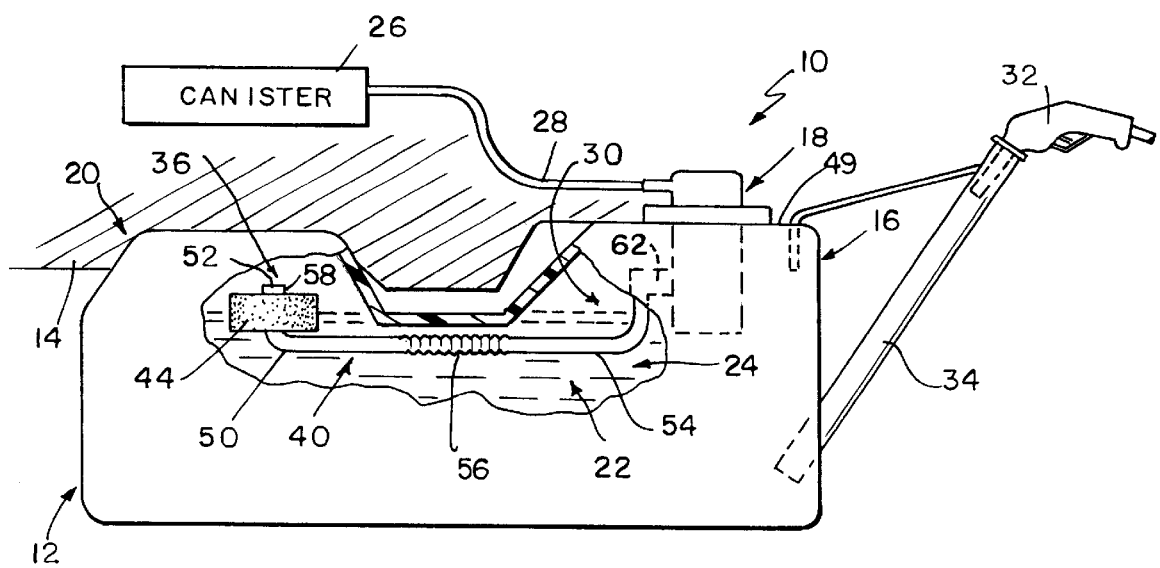
FIG. 1 is a side elevation view of a fuel tank fixed to the irregular underside of a vehicle, with portions broken away from the tank, showing a pair of vapor domes and a fuel vapor transfer apparatus in accordance with the present invention, the fuel vapor transfer apparatus providing a vent passageway extending therethrough to permit venting of pressurized fuel vapor from the "isolated" left-side vapor dome to the "vented" right-side vapor dome for distribution to a vapor-recovery canister through a fuel vapor vent apparatus.
Figure 2:
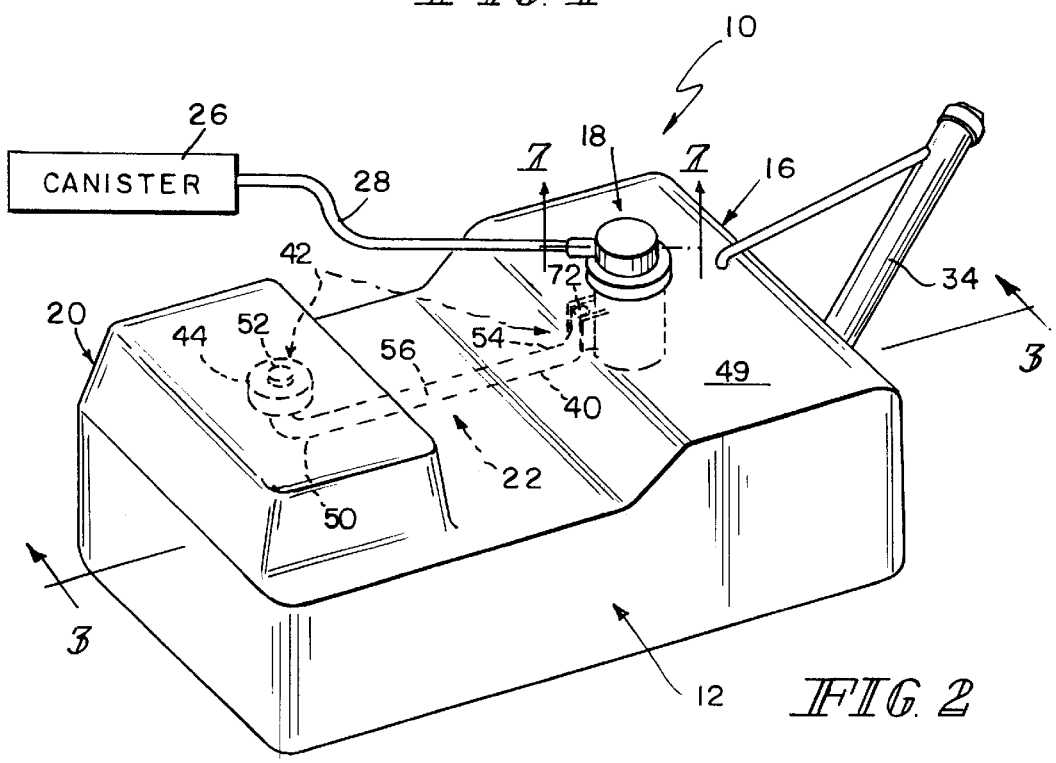
FIG. 2 is a perspective view of the fuel tank of FIG. 1 showing the location and orientation of the fuel vapor transfer apparatus in relation to the vent valve apparatus, the left-side and right-side fuel vapor domes, the filler neck, and a vapor-recovery canister.

Illustrations of a tank venting system in accordance with the present invention are shown in FIGS. 1 and 2. Tank venting system 10 includes a tank 12 mounted on the underside 14 of a vehicle, a first vapor dome 16 on tank 12, a vent apparatus 18 coupled to the first vapor dome 16, and a second vapor dome 20 on tank 12. The tank venting system 10 further includes a fuel vapor transfer apparatus 22 positioned to lie in an interior region 24 in tank 12 and transfer pressurized fuel vapor trapped in second vapor dome 20 to first vapor dome (even though tank 12 is filled substantially with liquid fuel) so that such pressurized fuel vapor can be vented to a vapor-recovery canister 26 by means of vent apparatus 18 and a discharge conduit 28 that is arranged to interconnect vent apparatus 18 and vapor-recovery canister 26.

Many fuel tanks have a shape that creates two vapor domes that are isolated from one another at or near a "full tank" (i.e. a vehicle fuel tank that has been filled to capacity with liquid fuel). Each vapor dome must be vented separately to allow the liquid fuel to reach equal levels in both vapor domes and to cause any excessive fuel vapor pressure extant in both domes to be dissipated in accordance with a predetermined specification. Currently such vapor dome venting is accomplished by mounting various venting valves in each vapor dome. Due to new LEV-II regulations, there is a need to reduce the number of holes formed in the top of a vehicle fuel tank.

Vent apparatus 18 is, for example, a fill-limit vent valve that functions to vent fuel vapor from a first vapor-receiving space 30 formed in first vapor dome 16 to a destination outside tank 12 under certain specified conditions and to block fuel vapor venting during certain stages of filling the tank with liquid fuel discharged from a pump nozzle 32 into a filler neck 34 coupled to tank 12. Fuel vapor transfer apparatus 22 provides a vent passageway 47 between a second vapor-receiving space 36 formed in the second vapor dome and first vapor-receiving space 30 formed in first vapor dome 16. In this way, second vapor dome 20 need not be provided with a second vent apparatus like vent apparatus 18 and instead is vented using fuel vapor transfer apparatus 22 and vent apparatus 18. This eliminates an extra valve and therefore an extra hole in the tank 12.

Fuel vapor transfer apparatus 22 includes a fuel vapor transfer conduit 40 and a conduit support 42 including a buoyant float 44 coupled to an inlet end of transfer conduit 40 and an anchor 46 coupled to first vapor dome 16 and configured to support an outlet end of transfer conduit 40. Conduit support 42 is arranged to support transfer conduit 40 in a position that is partly submerged in liquid fuel when the tank 12 is full to allow pressurized fuel vapor "trapped" in second vapor dome 20 to "escape" and vent to first vapor dome 16 through a vent passageway 47 formed in transfer conduit 40 as shown, for example, in FIG. 3. Because of such a fuel vapor transfer, a single vent apparatus such as vent apparatus 18 mounted in first vapor dome 16 can operate to vent excess pressurized fuel vapor from two isolated fuel vapor domes to vapor-recovery canister 26.

Figure 3:
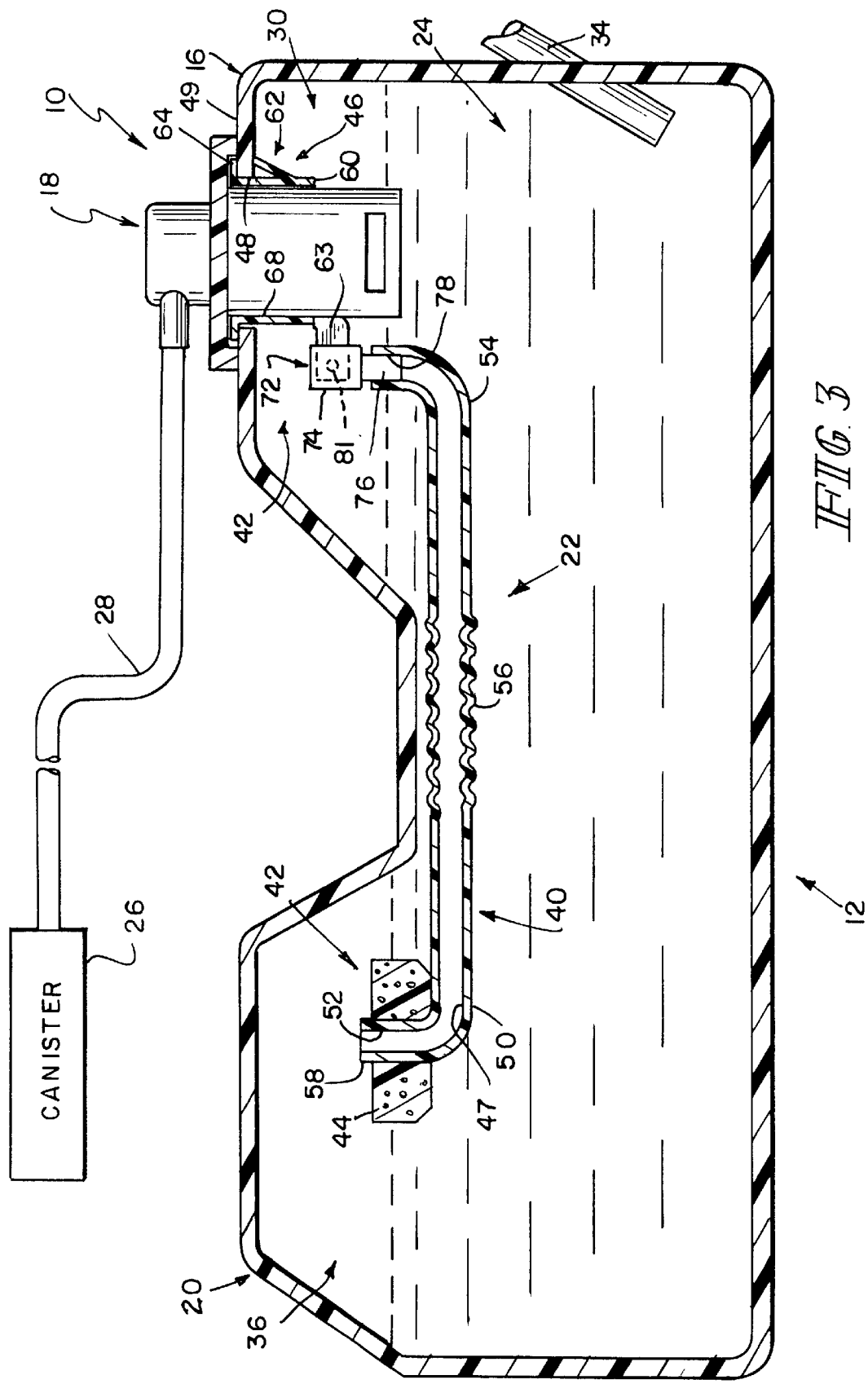
FIG. 3 is a sectional view taken along the line 3—3 of FIG. 2 showing the fuel vapor transfer apparatus configured to include a tubular conduit formed to include the vent passageway extending therethrough and a conduit support including a buoyant float ring coupled to the conduit at an inlet end thereof and an anchor suspended from a top wall of the right-side vapor dome and pivotably coupled to the conduit at an outlet end thereof.

Fuel vapor transfer conduit 40 includes an L-shaped inlet tube 50 formed to include conduit inlet 52 at a free end thereof, an L-shaped outlet tube 54, and a flexible tube 56 arranged to interconnect inlet and outlet tubes 50, 54 to establish vent passageway 47 in fuel vapor transfer conduit 40. Flexible tube 56 is formed of a pliable, bendable, and resilient material to include corrugations or other suitable flex means to permit transfer conduit 40 to be bent during insertion of transfer conduit 40 into interior region 24 of tank 12 through an aperture 48 formed in a top wall 49 of first vapor dome 16 and then move or return automatically to assume a straight or other predetermined shape (as shown in FIG. 3) once transfer conduit 40 has been deployed fully in interior region 24 of tank 12. Tubes 50, 56, and 54 cooperate to form a transfer tube including the conduit inlet 52.

Buoyant float 44 is a ring-shaped member made of a buoyant material able to float in liquid fuel extant in tank 12. Buoyant float 44 is formed to include a central aperture through which an upright section 58 of L-shaped inlet tube 50 passes as shown, for example, in FIGS. 1 and 3. Conduit inlet 52 is formed in an upper end of upright section 58 and buoyant float 44 is fixed or otherwise retained in a predetermined position on inlet tube 50 to cause conduit inlet 52 to communicate with pressurized fuel vapor extant in the second vapor-receiving space 36 formed in second vapor dome 20 whenever tank 12 is full or nearly full so that such fuel vapor can pass into and through vent passageway 47 formed in fuel vapor transfer conduit 40 to reach the first vapor-receiving space 30 formed in first vapor dome 16.

Figure 4:
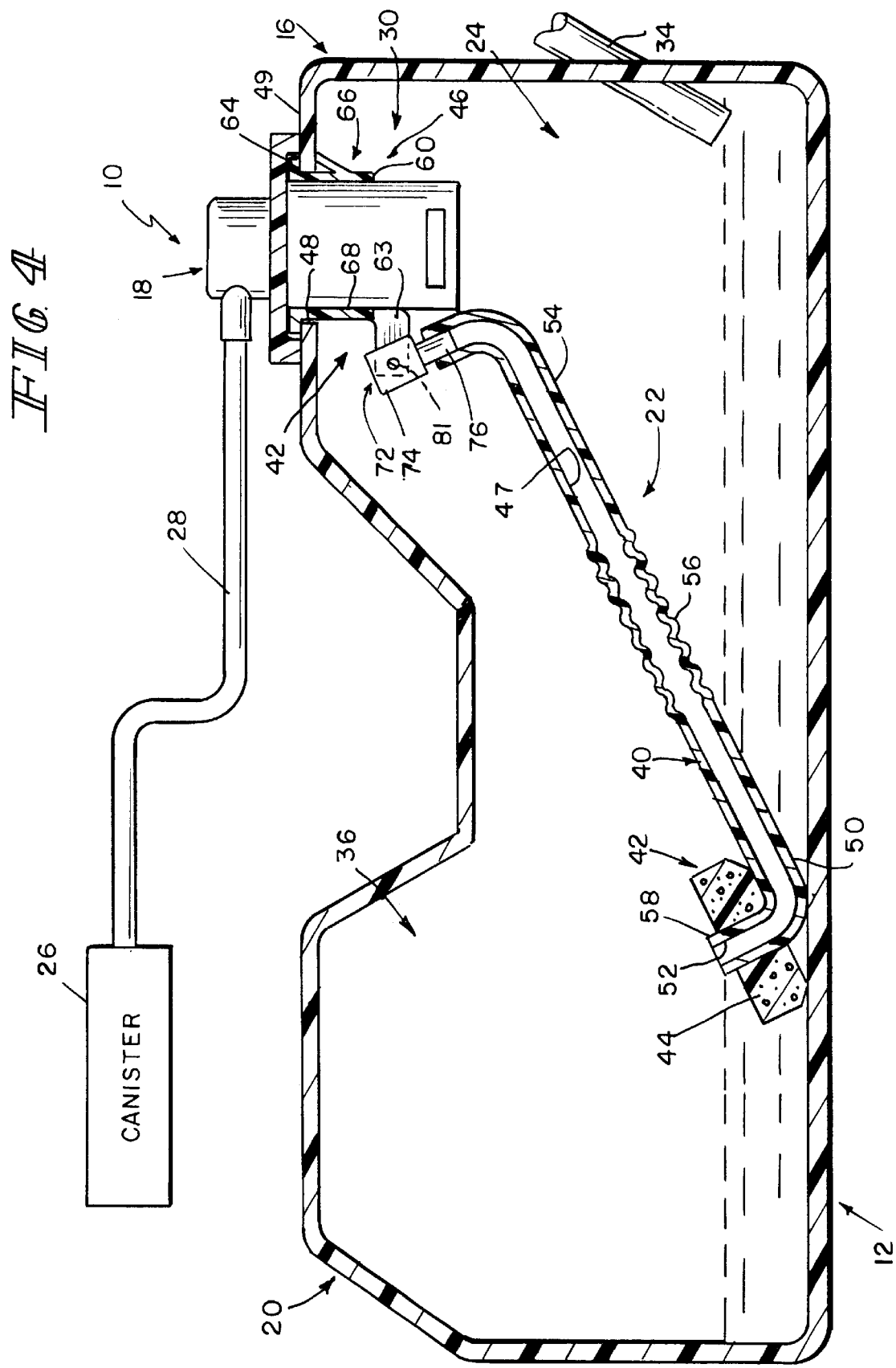
FIG. 4 is a sectional view similar to that of FIG. 3 showing the fuel tank nearly empty and the tubular conduit after it has pivoted about the pivot established at the outlet end thereof to move the conduit inlet to a lowered position at a low level of fuel in the tank.
Figure 6:
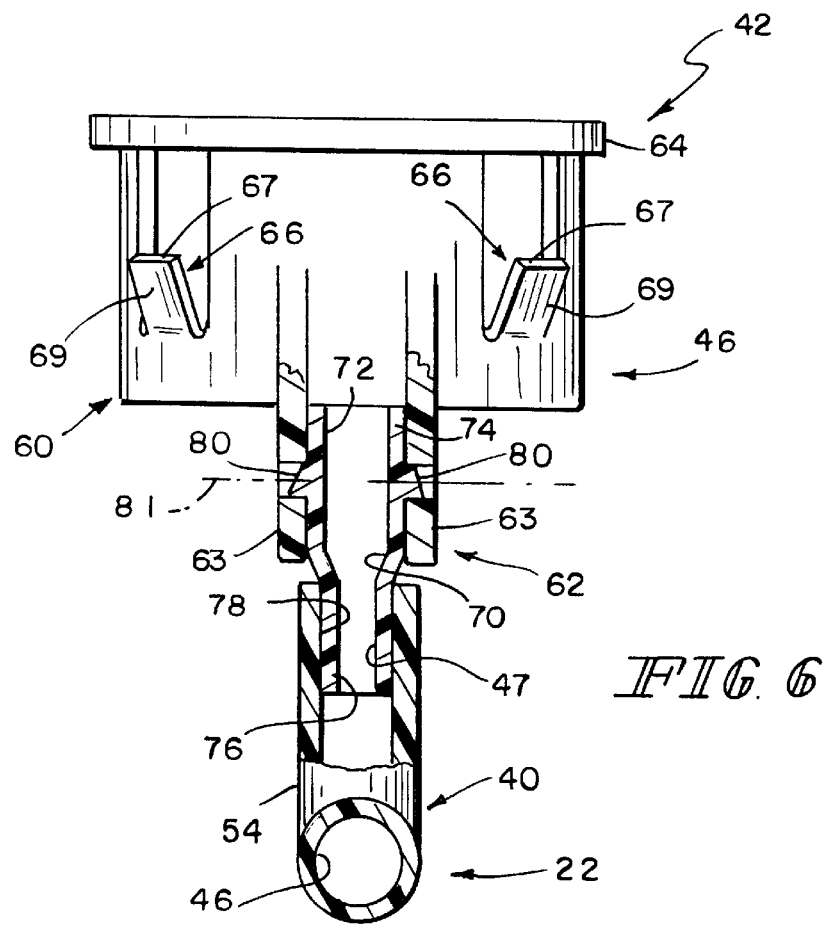
FIG. 6 is an enlarged view of the anchor of FIG. 5 showing a cylinder-shaped vent sleeve, a flange on an upper end of the vent sleeve, two of the deflectable anchor retainer flanges coupled to the vent sleeve, and a support frame coupled to the vent sleeve and showing a mount tube coupled at an upper end thereof to the support frame and at a lower end thereof to the tubular fuel vapor transfer conduit.
Figure 7:
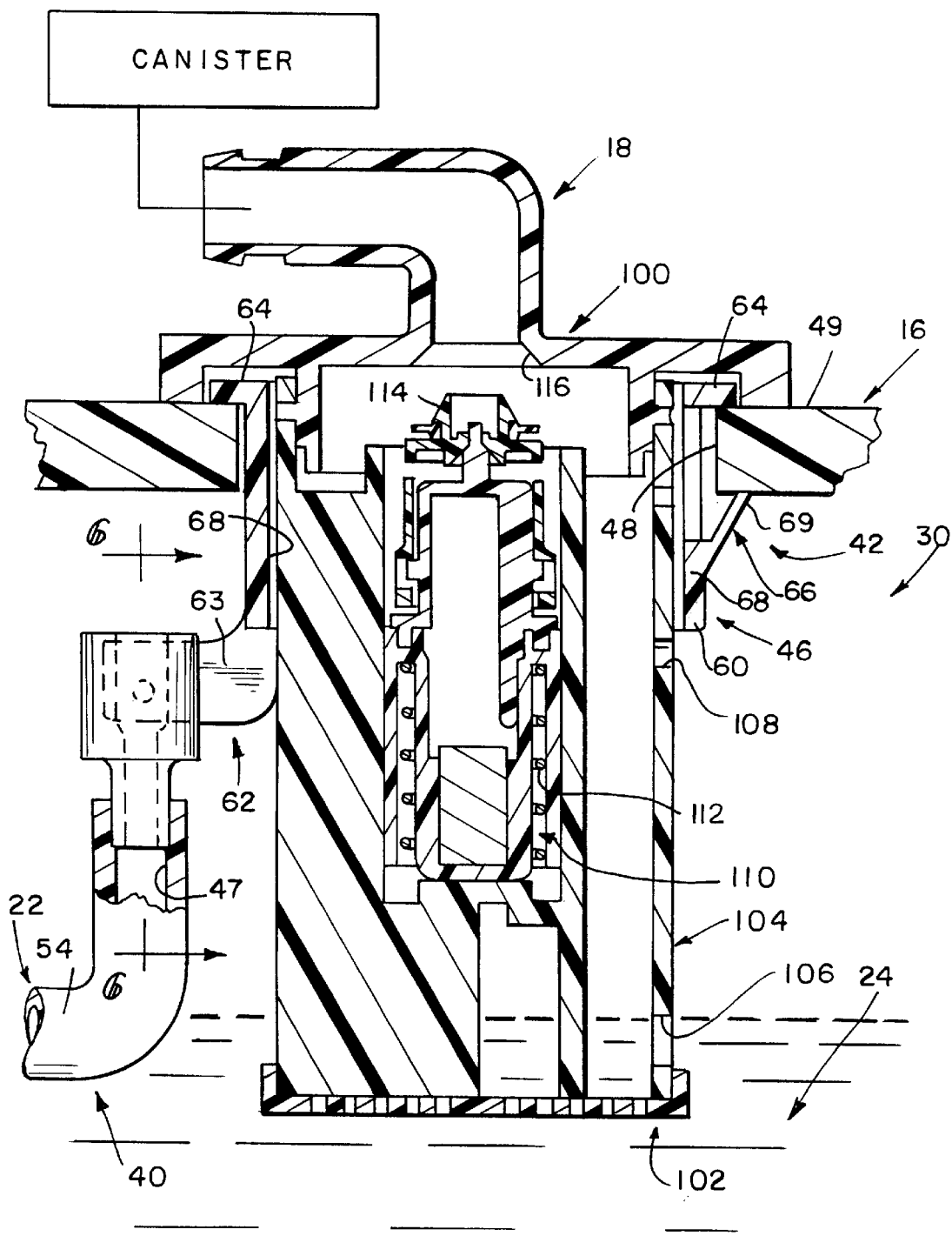
FIG. 7 is an enlarged sectional view of the vent apparatus shown in FIGS. 1 and 2 showing internal components of the vent apparatus.

Anchor 46 included in conduit support 42 is mounted, for example, in aperture 48 formed in top wall 49 of first vapor dome 16 as shown, for example, in FIGS. 3, 4, and 7 to support the outlet end of fuel vapor transfer conduit 40 in a desired position in the first vapor-receiving space 30 formed in first vapor dome 16. As shown best in FIGS. 4–6, anchor 46 includes a vent sleeve 60 sized to lie in aperture 48, a (transfer conduit) support frame 62 coupled to vent sleeve 60 and positioned to lie in the first vapor-receiving space 30 formed in first vapor dome 16, a radially outwardly extending annular tank flange 64 coupled to an upper end of vent sleeve 60 and arranged to engage a top surface of top wall 49 when anchor 46 is mounted in first vapor dome 16, and one or more deflectable anchor retainer flanges 66 coupled to vent sleeve 60 and spaced circumferentially about a cylindrical exterior surface of vent sleeve 60.

Figure 5:
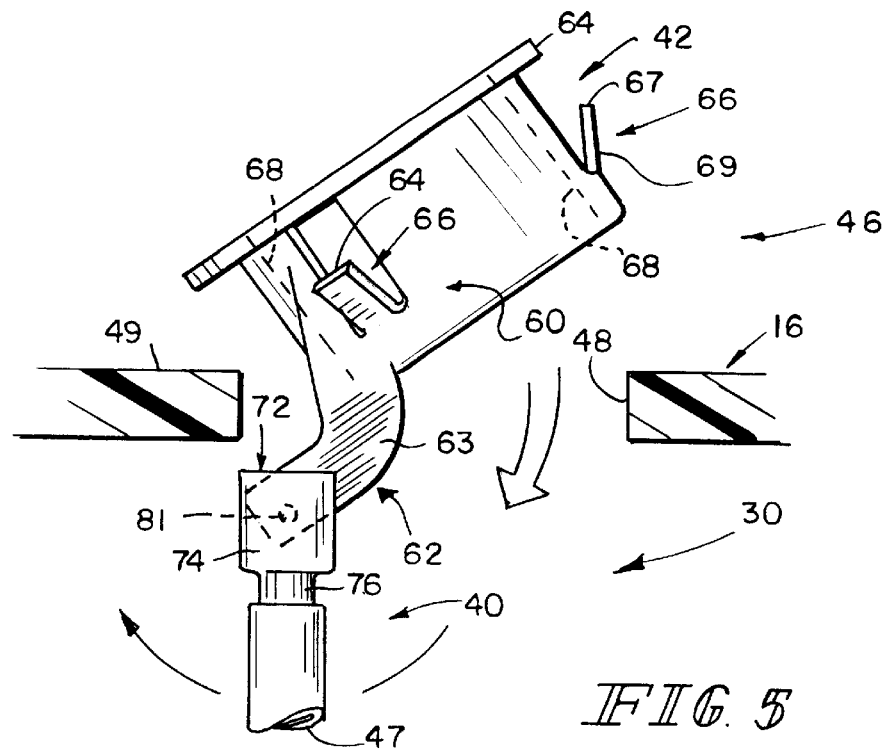
FIG. 5 is an enlarged view of the anchor included in the conduit support as the anchor is being lowered into an aperture formed in the top wall of the right-side vapor dome after the fuel vapor transfer conduit (the outlet end of which is pivotably coupled to the anchor) has been passed into the right-side vapor dome.

Vent sleeve 60 is a cylinder-shaped tube formed to include a passageway 68 receiving the vent apparatus 18 therein as shown, for example, in FIGS. 4 and 5. Vent sleeve 60 is sized to fit into aperture 48 formed in top wall 49 of first vapor dome 16. In the illustrated embodiment, portions of the vent sleeve 60 are formed to provide tabs which serve as the deflectable anchor retainer flanges 66 as shown in FIGS. 5 and 6. Once anchor 46 is installed, the top wall 46 is trapped between the underside of annular tank flange 64 and free ends 67 of anchor retainer flanges 66 as shown, for example, in FIGS. 3 and 4. Those free ends 67 will deflect and move inwardly toward a central vertical axis of vent sleeve 60 as the angled outer walls 69 of the anchor retainer flanges 66 cam against an edge of top wall 49 defining the boundary of aperture 48 during insertion of vent sleeve 60 into aperture 48.

Support fame 62 includes a pair of frame arms 63 that are cantilevered to depend from an exterior side wall of the vent sleeve 60 and arranged to lie in spaced-apart parallel relation one to another as shown best in FIGS. 5 and 6. The outlet end of fuel vapor transfer conduit 40 is pivotably coupled to free ends of the two frame arms 63.

Fuel vapor transfer conduit 40 further includes a mount tube 70 coupled at one end to outlet tube 54 and at another end to the frame arms 63 of support frame 62 as shown, for example, in FIGS. 4–6. Mount tube 70 is formed to include a portion of vent passageway 47 therein and to define a conduit outlet 72 through which pressurized fuel vapor traveling through vent passageway 47 passes to empty into the first vapor-receiving space 30 formed in first vapor dome 16. An upper portion 74 of mount tube 70 is formed to include conduit outlet 72 and lie between frame arms 63 and a lower portion 76 of mount tube 70 is inserted into an opening 78 formed in outlet tube 54. Pivot pins 80 are appended to upper portion 74 and arranged to fit into apertures formed in frame arms 63 to serve as a pivot axles so that fuel vapor transfer conduit 40 can pivot about a pivot axis 81 established by pivot pins 80 from the raised position shown in FIG. 3 to the lowered position shown in FIG. 4.

A configuration of vent apparatus 18 is shown, for example, in FIG. 7. A suitable vent apparatus is disclosed in U.S. Pat. No. 5,694,968, which disclosure is incorporated by reference herein. Vent apparatus 18 includes a vent fixture 100, a perforated baffle plate 102, and an elongated tubular skirt 104 interconnecting vent fixture 100 and baffle plate 102. Skirt 104 includes a lower side wall aperture 106 and an upper side wall aperture 108. These apertures conduct fuel vapor into vent apparatus 18 when perforated baffle plate 102 is closed by liquid fuel. Vent apparatus 18 also includes float member 110, rollover spring 112, and a closure member 114 sized to mate with valve seat 116.

Fuel vapor transfer apparatus 22 functions to allow for internal venting inside a fuel tank of multiple fuel vapor domes coupled to a fuel tank. The fuel vapor transfer apparatus 22 is inserted into fuel tank 12 through a hole 48 cut in a top wall 49 of a first vapor dome and then anchored in place using an anchor that extends through hole 48 and includes a central passage receiving vent apparatus 18 therein. Once vent apparatus 18 is welded or otherwise coupled to top wall 49 of first vapor dome 16, annular tank flange 64 is trapped between top wall 49 on a mounting flange included in vent passageway 18 to retain anchor 46 in a fixed position relative to first vapor dome 16.

The pivot provided at pivot axis 81 allows the inlet end of transfer conduit 40 to swing to the bottom wall of fuel tank 12 when the fuel level in the tank 12 recedes. In this way, any fuel which has splashed into and accumulated within vent passageway 47 in transfer conduit 40 will pour out of conduit 40, thereby ensuring a relatively free and clear vapor vent passageway 47 when the tank 12 has been refueled and transfer conduit 40 moves to assume a horizontal arrangement shown, for example, in FIG. 3 near the top of fuel tank 12.

Although the invention has been described in detail with reference to preferred embodiments, additional variations and modifications exist within the scope and spirit of the invention as described and defined in the following claims.

What is claimed is:

1. A tank system comprising
   a tank,
   first and second vapor domes mounted on top of the tank to lie in spaced-apart relation to one another so that each vapor dome receives fuel vapor generated by liquid fuel extant in the tank,
   a vent apparatus coupled to the first vapor dome, and
   dome vent means for transferring pressurized fuel vapor extant in the second vapor dome in to the first vapor dome through a vent passageway located in the tank to pass through liquid fuel vapor extant in the tank when the tank is full so that fuel vapor transferred into the first vapor dome can be vented to a destination outside the tank by the vent apparatus coupled to the first vapor dome.

2. The tank venting system of claim 1, wherein the dome vent means includes a fuel vapor transfer conduit formed to include a conduit inlet and a conduit outlet coupled to the conduit inlet by the vent passageway and a conduit support configured to place the conduit inlet in the second vapor dome and the conduit outlet in the first vapor dome.

3. The tank venting system of claim 2, wherein the conduit support includes a buoyant float coupled to the fuel vapor transfer conduit at the conduit inlet.

4. The tank venting system of claim 3, wherein the flow vapor transfer conduit includes an L-shaped inlet tube having a long leg arranged to extend toward the first vapor dome and a shorter upright leg arranged to lie in perpendicular relation to the long leg and the buoyant float is a ring around the shorter upright leg.

5. The tank venting system of claim 3, wherein the conduit support further includes an anchor coupled to the first vapor dome and coupled to the fuel vapor transfer conduit at the conduit outlet.

6. The tank venting system of claim 2, wherein the fuel vapor transfer conduit includes an inlet tube formed to include the conduit inlet, an outlet tube formed to include the conduit outlet, and a flexible bendable tube arranged to interconnect the inlet and outlet tubes to permit movement of the inlet tube relative to the outlet tube during insertion of the fuel vapor transfer conduit into the tank through the aperture formed in the first vapor dome.

7. The tank venting system of claim 6, wherein the tank includes a top wall positioned to lie between the first and second vapor domes and the flexible bendable tube is arranged to lie under the top wall in liquid fuel extant in the tank when the tank is full.

8. The tank venting system of claim 6, wherein each of the inlet and outlet tubes is L-shaped.

9. The tank venting system of claim 2, wherein the fuel vapor transfer conduit includes a transfer tube formed to include the conduit inlet and a mount tube coupled to the transfer tube and formed to include the conduit outlet and the mount tube is pivotably coupled to the conduit support for movement between a raised position wherein the conduit inlet is placed in the second vapor dome and the conduit outlet is placed in the first vapor dome and a lowered position wherein the conduit inlet is placed in the tank and the conduit outlet is placed in the first vapor dome.

10. The tank venting system of claim 9, wherein the conduit support includes a buoyant float coupled to the transfer tube at the conduit inlet and an anchor coupled to the first vapor dome and pivotably coupled to the mount tube at the conduit outlet.

11. The tank venting conduit of claim 1, wherein the first vapor dome is formed to include an aperture and the dome vent means includes a tubular conduit having a conduit inlet and outlet and an anchor mounted in the aperture formed in the first vapor dome and coupled to the tubular conduit at the conduit outlet.

12. The tank of claim 11, wherein the anchor includes a vent sleeve formed to include a central aperture and the vent apparatus is positioned to extend through the central aperture of the vent sleeve.

13. The tank of claim 12, wherein the anchor further includes a flange appended to an upper end of the vent sleeve and arranged to engage an outer surface of the first vapor dome and retainer means for engaging an inner surface of the first vapor dome upon insertion of the anchor into the first vapor dome through the aperture to retain the anchor in a mounted position therein.

14. The tank of claim 12, wherein the anchor further includes a flange appended to an upper end of the vent sleeve and arranged to engage an outer surface of the first vapor dome and the vent apparatus includes a vent housing and a mounting flange positioned to trap the flange of the anchor in a space formed between the outer surface of the first vapor dome and the mounting flange.

15. The tank of claim 11 wherein the anchor further includes a support frame coupled to the vent sleeve and a pivot coupled to the support frame and the tubular conduit to support the tubular conduit for pivotable movement in the tank relative to the support frame.

16. The tank system of claim 1, wherein the dome vent means is mounted for movement in the tank.

17. A tank venting system comprising a tank, first and second vapor domes mounted on top of the tank to lie in spaced-apart relation to one another so that each vapor dome receives fuel vapor generated by liquid fuel extant in the tank, a vent apparatus coupled to the first vapor dome, a tubular conduit positioned to lie in the tank and formed to include a conduit inlet and outlet, an anchor coupled to the first vapor dome to support the conduit outlet in the first vapor dome, and a buoyant float coupled to the tubular conduit to place the conduit inlet in the second vapor dome when the tank is full of fuel.

18. A tank venting system comprising a tank, first and second vapor domes mounted on top of the tank to lie in spaced-apart relation to one another so that each vapor dome receives fuel vapor generated by liquid fuel extant in the tank, the first vapor dome including a top wall formed to include an aperture, an anchor mounted in the aperture formed in the top wall of the first vapor dome and formed to include a central aperture, a tubular conduit positioned to lie in the tank and formed to include a conduit inlet and outlet, the tubular conduit being coupled to the anchor at the conduit outlet, and a vent apparatus mounted in the central aperture formed in the anchor and arranged to vent the first vapor dome and to vent fuel vapor transferred from the second vapor dome to the first vapor dome through the tubular conduit.

19. The tank venting system of claim 18, wherein the tubular conduit is positioned to lie and move in the tank.

20. A tank venting system comprising a tank formed to include an interior region, the tank including a top wall overlying a central portion of the interior region and defining a ceiling of the interior region and a bottom wall underlying the top wall and defining a floor of the interior region, a first vapor dome positioned to rise vertically above the top wall of the tank, the first vapor dome being positioned to form a first vapor-receiving space overlying a first side portion of the interior region of the tank adjacent to the central portion and communicating with the interior region of the tank to receive fuel vapor generated by liquid fuel contained in the interior region of the tank, a vent apparatus mounted on the first vapor dome in an aperture formed in the first vapor dome to vent the first vapor-receiving space, a second vapor dome positioned to rise vertically above the top wall of the tank, the second vapor dome being positioned to form a second vapor-receiving space overlying a second side portion of the interior region of the tank separated from the first side portion of the interior region of the tank by the central portion and communicating with the interior region of the tank to receive fuel vapor generated by liquid fuel contained in the interior region of the tank, a fuel vapor transfer conduit formed to include a conduit inlet, a conduit outlet, and a vent passageway extending therebetween, and a conduit support arranged to support the fuel transfer conduit in the interior region of the tank under the top wall of the tank to position the conduit inlet in communication with pressurized fuel vapor extant in the second vapor-receiving space formed in the second vapor dome when a liquid fuel level in the interior region of the tank has risen to reach the ceiling of the interior region to block flow of pressurized fuel vapor from the second vapor-receiving space to the first vapor-receiving space through the interior region of the fuel tank and to position the conduit outlet in the first vapor-receiving space to cause pressurized fuel vapor extant in the second vapor-receiving space to pass into the first vapor-receiving space through the vent passageway formed in the fuel transfer conduit so that said pressurized fuel vapor can be vented to a destination outside of the tank by the vent apparatus mounted on the first vapor dome.

21. The system of claim 20 wherein the conduit support includes a buoyant float coupled to the fuel vapor transfer conduit at the conduit inlet and configured to float upwardly as the level of liquid fuel in the interior region rises to reach the ceiling to cause the conduit inlet to be retained buoyantly in communication with pressurized fuel vapor extant in the second vapor-receiving space formed in the second vapor dome.

22. The system of claim 21, wherein the buoyant float is ring-shaped and formed to include a central aperture receiving a portion of the fuel vapor transfer conduit defining the conduit inlet therein.

23. The system of claim 21, wherein the conduit support further includes an anchor positioned to lie in the first vapor-receiving space formed in the first vapor dome and coupled to the fuel vapor transfer conduit at the conduit outlet to retain the conduit outlet in communication with pressurized fuel vapor extant in the first vapor-receiving space formed in the first vapor dome.

24. The system of claim 23, wherein the anchor includes a guide ring mounted on the first vapor dome and a pivot coupled to the guide ring and to the fuel vapor transfer conduit to support the fuel vapor transfer conduit for pivotable movement in the interior region of the fuel tank between a raised position wherein the conduit inlet is positioned to receive pressurized fuel vapor trapped in the second vapor-receiving space formed in the second vapor dome by liquid fuel at a level high enough in the tank to reach the ceiling and a lowered position wherein the conduit inlet is positioned to lie at a lower elevation in the tank in close proximity to the floor of the interior region of the tank.

25. The system of claim 23, wherein the anchor includes a vent sleeve positioned to lie in the aperture formed in the first vapor dome and formed to include a passage receiving the vent apparatus therein, flanges coupled to the vent sleeve to engage the first vapor dome to retain the vent sleeve in a fixed position relative to the first vapor dome, and a support frame coupled to the vent sleeve and to the fuel vapor transfer conduit.

26. The tank venting system of claim 20, wherein the conduit support is arranged to support the fuel transfer conduit for movement in the interior region of the tank.

* * * * *